(12) United States Patent
Chih et al.

(10) Patent No.: US 10,713,348 B2
(45) Date of Patent: Jul. 14, 2020

(54) SYSTEM, METHOD, AND APPARATUS FOR TOUCH PANEL SECURITY

(71) Applicant: Microchip Technology Incorporated, Chandler, AZ (US)

(72) Inventors: Hsin-Ching Chih, New Taipei (TW); Chi-Chun Cheng, Taipei (TW)

(73) Assignee: Microchip Technology Incorporated, Changler, AZ (US)

( * ) Notice: Subject to any disclaimer, the term of this patent is extended or adjusted under 35 U.S.C. 154(b) by 135 days.

(21) Appl. No.: 15/904,147

(22) Filed: Feb. 23, 2018

(65) Prior Publication Data

US 2018/0300470 A1    Oct. 18, 2018

Related U.S. Application Data

(60) Provisional application No. 62/485,747, filed on Apr. 14, 2017.

(51) Int. Cl.
| | |
|---|---|
| *G06F 21/44* | (2013.01) |
| *G06F 3/044* | (2006.01) |
| *G06F 3/041* | (2006.01) |
| *G06F 21/73* | (2013.01) |
| *G06F 21/57* | (2013.01) |
| *H04L 9/32* | (2006.01) |

(52) U.S. Cl.
CPC .............. *G06F 21/44* (2013.01); *G06F 3/044* (2013.01); *G06F 3/0412* (2013.01); *G06F 3/0416* (2013.01); *G06F 21/57* (2013.01); *G06F 21/73* (2013.01); *H04L 9/3278* (2013.01); *G06F 2221/034* (2013.01)

(58) Field of Classification Search
CPC .......... G06F 3/011; G06F 21/57; G06F 21/73; G06F 3/0416; G06F 3/044; G06F 21/44; G06F 3/0412; G06F 2221/034; H04L 9/3278
See application file for complete search history.

(56) References Cited

U.S. PATENT DOCUMENTS

| | | | |
|---|---|---|---|
| 4,264,782 A * | 4/1981 | Konheim | ............ G06Q 20/401 340/5.73 |
| 5,648,642 A | 7/1997 | Miller et al. | |
| 5,730,165 A | 3/1998 | Philipp | |

(Continued)

OTHER PUBLICATIONS

Written Opinion of the International Searching Authority for PCT Application No. PCT/US2018/027168, dated Jun. 18, 2018, seven pages.

(Continued)

*Primary Examiner* — Bryan Earles
(74) *Attorney, Agent, or Firm* — TraskBritt

(57) ABSTRACT

Embodiments of the disclosure relate, generally, to touch panel security, and more specifically, to using one or more security features present at one or more electrodes of a sensor module of a touch panel. Embodiments of security features may affect the capacitive coupling at a node of a sensor in a manner detectable by a microcontroller or other logic circuitry, and the location of the security features may provide a basis for an identifier usable to identify a touch panel to a host device with which the touch panel attempts to communicate.

32 Claims, 12 Drawing Sheets

(56) References Cited

U.S. PATENT DOCUMENTS

| | | | | |
|---|---|---|---|---|
| 5,734,819 A * | 3/1998 | Lewis | ................... | G06F 21/121 |
| | | | | 380/45 |
| 6,288,707 B1 | 9/2001 | Philipp | | |
| 6,452,514 B1 | 9/2002 | Philipp | | |
| 7,843,339 B2 * | 11/2010 | Kirmayer | ............. | G06Q 20/341 |
| | | | | 340/539.23 |
| 9,507,466 B2 * | 11/2016 | Moore | ................... | G06F 3/044 |
| 2008/0181409 A1 * | 7/2008 | Wang | ................... | H04L 9/3234 |
| | | | | 380/277 |
| 2011/0248838 A1 | 10/2011 | Krahenbuhl et al. | | |
| 2013/0222320 A1 | 8/2013 | Huang et al. | | |
| 2014/0226879 A1 * | 8/2014 | Westerman | ........ | G06K 9/00013 |
| | | | | 382/125 |

OTHER PUBLICATIONS

International Search Report for PCT Application No. PCT/US2018/027168, dated Jun. 18, 2018, four pages.

\* cited by examiner

SYSTEM, METHOD, AND APPARATUS FOR TOUCH PANEL SECURITY

CROSS-REFERENCE TO RELATED APPLICATION

This application claims the benefit under 35 U.S.C. § 119(e) of U.S. Provisional Patent Application Ser. No. 62/485,747, filed Apr. 14, 2017, the entire contents and disclosure of which is hereby incorporated herein by this reference.

TECHNICAL FIELD

This disclosure relates, generally, to security features for touch panels that use capacitive sensing.

BACKGROUND

Touch panels are used as input devices for a variety of host appliances and systems such as automated teller machines (ATMs), automobiles, computers, tablets, home security systems, etc. It is sometimes possible for a second, phony, input device to communicate with a host. Identification codes may be used to authenticate and reject such phony input devices. The input device provides the identification code and the host compares it to a stored identifier (ID). If the provided ID does not match the stored ID then the host may reject commands or data provided by the input device. It is possible, however, to acquire device IDs that are stored in a memory at a legitimate input device, for example, by cloning, enabling a phony device to provide the ID to the host.

BRIEF DESCRIPTION OF THE DRAWINGS

Advantages of the embodiments of the disclosure will be apparent to those of ordinary skill in the art from the following detailed description and the accompanying drawings.

DETAILED DESCRIPTION

Figure 1:
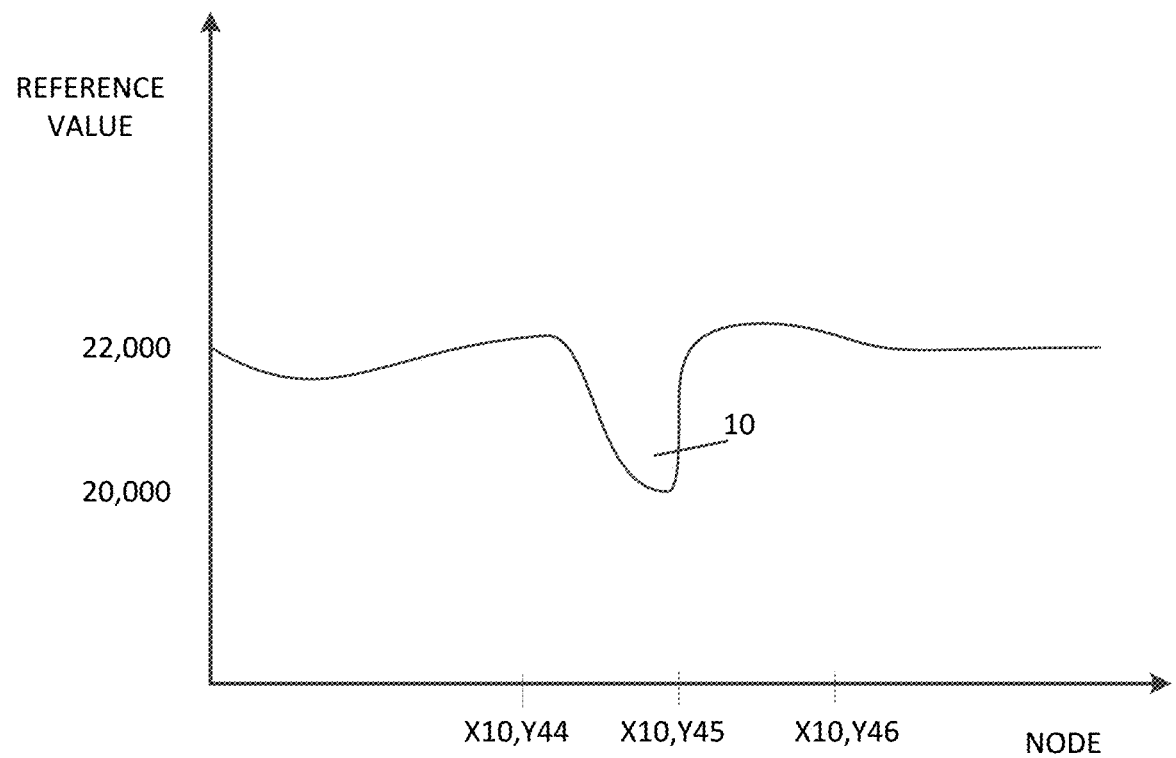
FIG. 1 shows a graph of reference values indicative of a DIP-hole security feature according to an embodiment of the disclosure.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, arrangement, configuration, or any other property.

Specific implementations shown and described are only examples and should not be construed as the only way to implement the present disclosure unless specified otherwise herein. Elements, circuits, and functions may be shown in block diagram form to avoid obscuring the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to a person of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of a person of ordinary skill in the relevant art.

Thus, examples provided in the present disclosure are intended to help enable a person of ordinary skill in the art to practice the disclosure and the disclosed embodiments. The use of the terms "exemplary," "by example," "for example," and the like, mean that the related description is explanatory and non-limiting, and while the scope of the disclosure is intended to encompass the examples of the present disclosure and their legal equivalents, the use of such terms is not intended to limit the scope of an embodiment or this disclosure to the specified components, steps, features, functions, or the like.

A person of ordinary skill in the art would understand that information and signals may be represented using any of a variety of different technologies and techniques. For example, data, instructions, commands, information, signals, bits, symbols, and chips that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general-purpose processor, a special-purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein.

A general-purpose processor may be a microprocessor, but in the alternative, the processor may be any conventional processor, controller, microcontroller, or state machine (e.g., a configurable state machine). A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

Embodiments of the disclosure may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

The various embodiments described herein relate to introducing security features to sensor modules of touch panels and microcontrollers (and other logic circuitry) that may be used to generate a "fingerprint" for the touch panel device. In other words, due to the security features, a contact sensor's response to stimulus (e.g., a drive cycle) may exhibit one or more detectable characteristics, which may be characterized as a fingerprint or the basis for a fingerprint of the device that includes the security features.

The security features are not easily replicated or cloned, thus, the device's fingerprint is not easily discovered.

Touch panels typically comprise contact sensors in a two-dimensional (2D) arrangement on a display screen. A contact sensor may respond to an object's (such as a finger or a stylus) contact with, or the object's proximity to, a contact-sensitive area of the contact sensor. In this disclosure "contact" may mean both an object's physical contact with a contact-sensitive area and an object's presence within the proximity of a contact-sensitive area without physical contact.

There are a number of different types of contact sensors, by way of non-limiting example, resistive sensors, surface acoustic wave sensors, and capacitive sensors (also referred to as projective sensors).

When an object contacts a capacitive contact sensor, a change in capacitance may occur within the sensor at or near the location of the contact. A controller may process changes in capacitance, and responsive to such changes, may determine an object contacted the sensor. "Charge-then-transfer" is a technique implemented in some controllers to measure capacitive changes, whereby a sensing capacitor is charged and the charge is transferred to an integrating capacitor over multiple charge-transfer cycles. When a reference voltage is reached at the integrating capacitor, the number of capacitive charge cycles (i.e., counts) may be recorded and compared to a threshold to determine if an object contacted the sensor.

Mutual capacitance sensors are capacitive field sensors that detect changes in capacitance between two electrodes: a drive electrode and a sense electrode. The principles of mutual capacitance sensing are described in U.S. Pat. No. 6,452,514, entitled "Capacitive Sensor and Array," issued on Sep. 17, 2002, the entire contents and disclosure of which is incorporated herein by this reference.

Touch sensors are a type of contact-sensors overlaid in a two-dimensional (2-D) arrangement on a display screen for user interaction. The display screens that incorporate touch sensors are commonly referred to as "touch screens" or "touch panels" and they may be grouped into the same types as touch sensors: resistive, surface acoustic wave, and capacitive. The use of the charge-transfer technology is described in U.S. Pat. No. 5,730,165 in one and two dimensions is described in U.S. Pat. No. 6,288,707, entitled "Charge Transfer Capacitive Position Sensor," issued on Oct. 15, 2002, the entire contents and disclosure of which is incorporated herein by this reference. A matrix sensor approach of mutual capacitance sensors employing charge-transfer techniques for a touch screen is described in U.S. Pat. No. 5,648,642, entitled "Object Position Detector," issued Jul. 15, 1997, the entire contents and description of which is incorporated herein by this reference.

U.S. Pat. Nos. 5,648,642 and 6,452,514 describe, generally, drive electrodes extending in rows on one side of a substrate and sense electrodes extending in columns on the other side of the substrate so as to define a "matrix" array of N by M nodes. Each node corresponds to an intersection between the electrically conductive lines of a drive electrode and of a sense electrode. A drive electrode simultaneously drives all of the nodes in a given column and a sense electrode senses all of the nodes in a given row. The capacitive coupling of the drive electrode and sense electrode at a node position may be determined by driving a column and sensing a row. By way of example, if a drive signal is applied to the drive electrode of row 3 and a sense electrode of column 2 is active then the node position is: (row 3, column 2). Nodes can be scanned by sequencing through different combinations of drive and sense channels. In one mode the drive electrodes may be driven sequentially while the sense electrodes are all continuously monitored.

Microcontrollers may be implemented to control the drive electrode and detect the capacitive coupling of the drive electrode and the sense electrode. They may also provide the input and output pins to communicate with a host to which a touch panel is connected and the firmware to control the operation of the touch screen and control communication with a host. Microcontrollers may be fabricated within an integrated circuit package.

It would be advantageous for a host to verify an identity of an input device using features and/or techniques that are not susceptible (or less susceptible) to techniques for illegitimately acquiring device IDs of conventional input devices.

In various embodiments of this disclosure, one or more security features are introduced to one or more nodes of a sensor module during and/or after fabrication. Each security feature affects the capacitive coupling at the node in a manner that is captured by the microcontroller when it scans the sensor module's drive and sense channels.

FIG. 1 illustrates a dual-in-line package (DIP) hole security feature 10, according to an embodiment of the disclosure. A DIP-hole is a node that has a lower associated reference value (e.g., count) than other nodes. For example, the DIP-hole node X10, Y45 illustrated in FIG. 1 has a reference value of 20,000 counts compared to a standard reference value of 22,000 counts. In one embodiment, the DIP-hole may be introduced by trimming or cutting a metal bridge that connects drive electrodes forming a drive line during fabrication of the sensor module. By way of non-limiting example, trimming or cutting may be performed by a laser.

Figure 2:
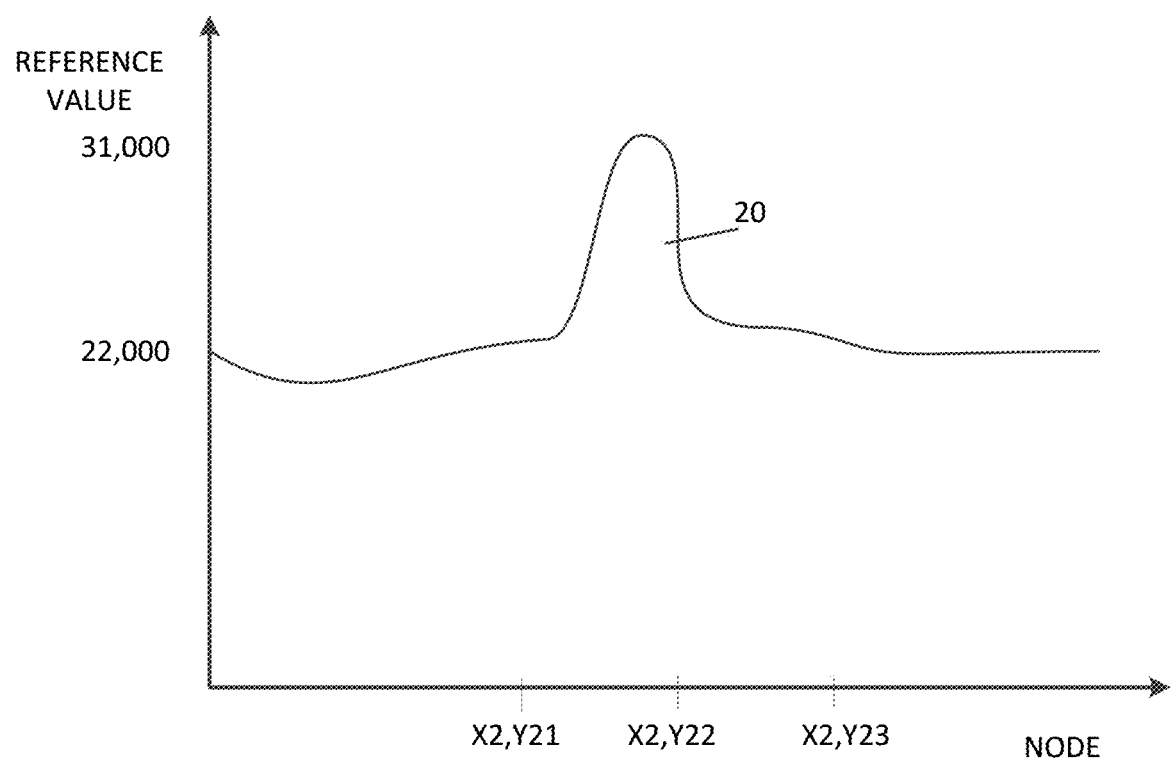
FIG. 2 shows a graph of reference values indicative of a SPIKE-peak security feature according to an embodiment of the disclosure.

FIG. 2 illustrates a SPIKE-peak security feature 20 according to an embodiment of the disclosure. A SPIKE-peak is a node that has a higher associated reference value (e.g., count) than other nodes. For example, the SPIKE-peak node X2, Y22 has a reference value of 30,000 counts compared to a standard reference value of 22,000 counts. In one embodiment, the SPIKE-peak may be introduced by coupling (i.e., shorting) the drive/sense lines at a node during fabrication of the sensor module. By way of non-limiting example, the drive/sense lines may be coupled by forming additional traces in the metallization layer forming the drive line/sense line.

Figure 3:
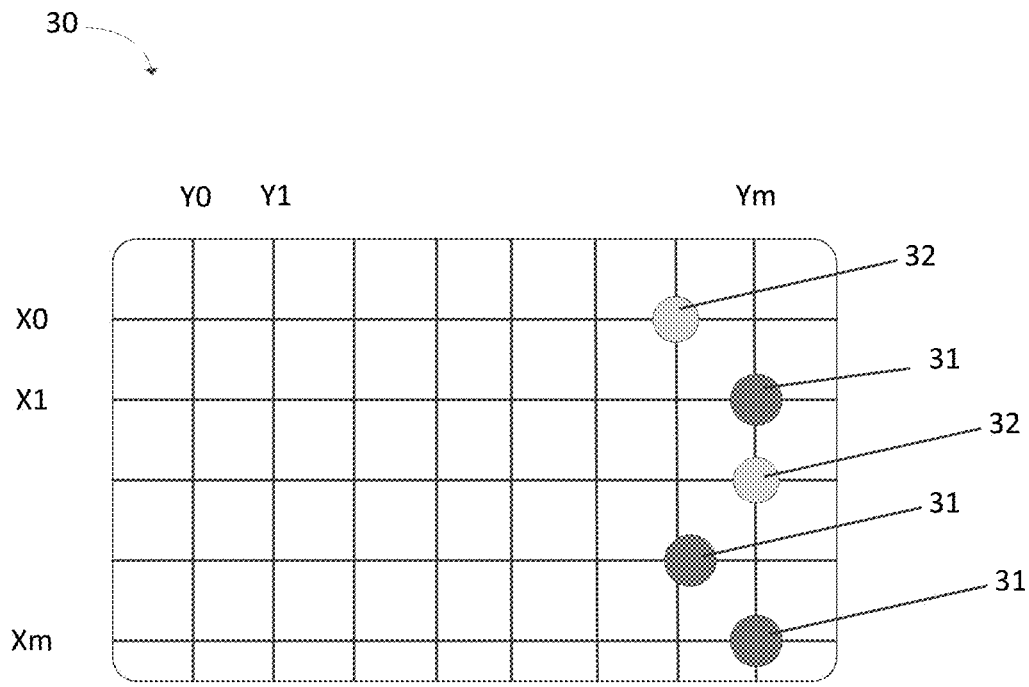
FIG. 3 shows a diagram of a sensor module that has several security features according to an embodiment of the disclosure.

FIG. 3 illustrates a sensor module 30 having several DIP-hole nodes 31 and SPIKE-peak nodes 32. The DIP-hole and SPIKE-peak reference values associated with the DIP-hole nodes 31 and SPIKE-peak nodes 32, as well as spatial arrangements may be the basis for a "fingerprint" that is an identifier for the sensor module. In various embodiments, the reference values and spatial arrangement may be a design consideration that may be made at the design layout and manufacturing phases of a sensor module.

Figure 4:
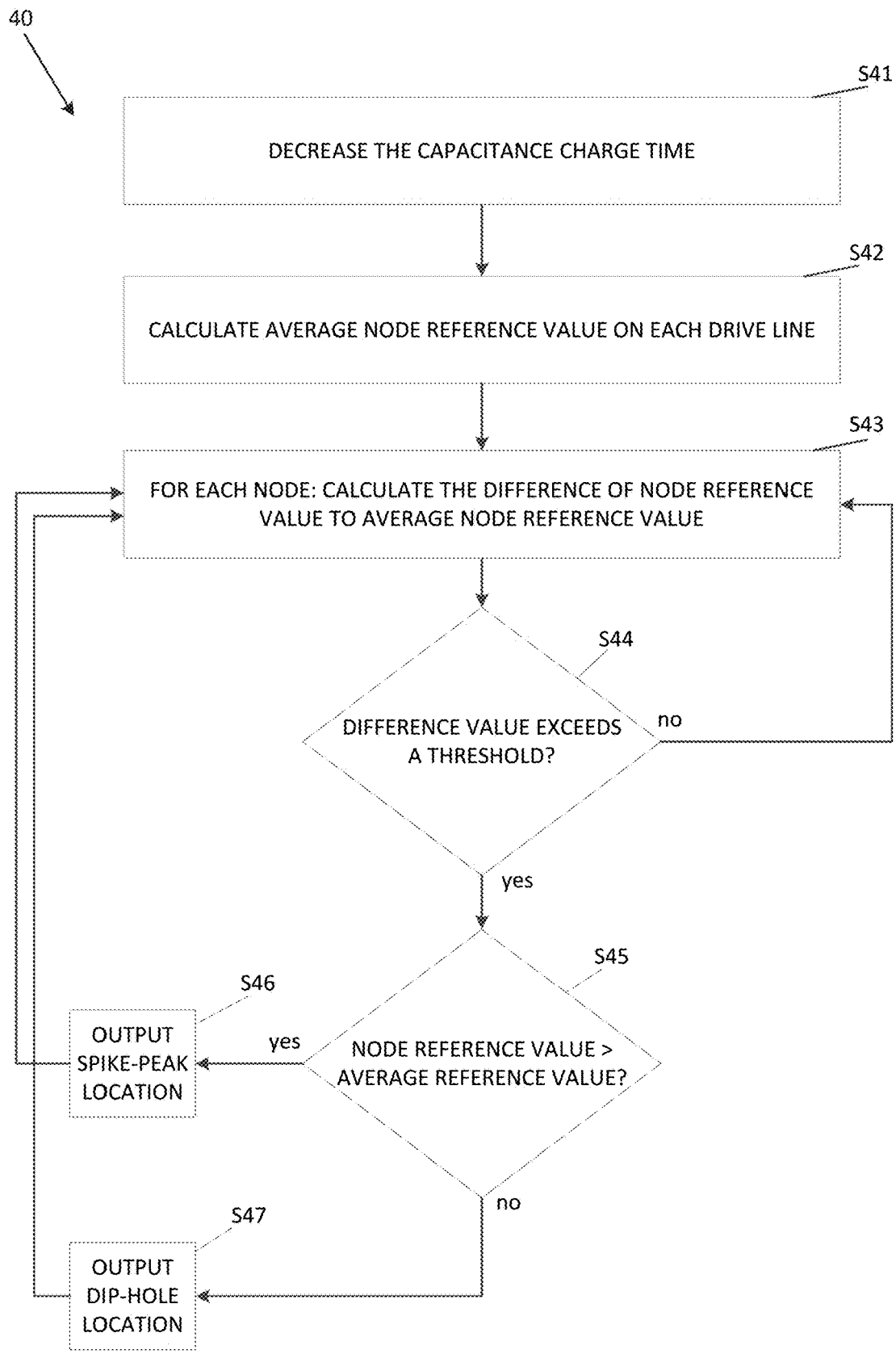
FIG. 4 shows a flowchart of a process for identifying the presence of security features in a sensor module according to an embodiment of the disclosure.

FIG. 4 illustrates a process 40 for identifying DIP-holes and SPIKE-peaks and their locations. A sensing capacitor's charge time may be decreased in operation S41. Charge time may be decreased, for example, by configuring an RC time constant associated with a sensing capacitor. Decreasing the charge time increases the number of charge-transfer cycles for the integrating capacitor to reach a reference voltage. This effectively emphasizes the difference in the reference values of the DIP-hole and SPIKE-peak nodes versus the other nodes. In one embodiment, a mutual capacitance charge time is decreased by about 40%. An average reference value may be determined for the nodes of a drive line in operation S42. For each node, a difference may be calculated between the reference value for that node and the average reference value, in operation S43. A determination may be made whether the difference value exceeds a threshold in operation S44. If the difference value does not exceed the threshold then the node is a not a SPIKE-peak or DIP-hole, and the next node may be evaluated. If the difference value exceeds the threshold then the node is either a SPIKE-peak or a DIP-hole and a determination may be made whether the reference value for the node is greater than the average reference value or is less than the average reference value in operation S45. If the reference value is greater than the average reference value then the node's location may be output as a SPIKE-peak location in operation S46. If the reference value is less than the average reference value then the node's location may be output as a DIP-hole location in operation S47.

Figure 5:
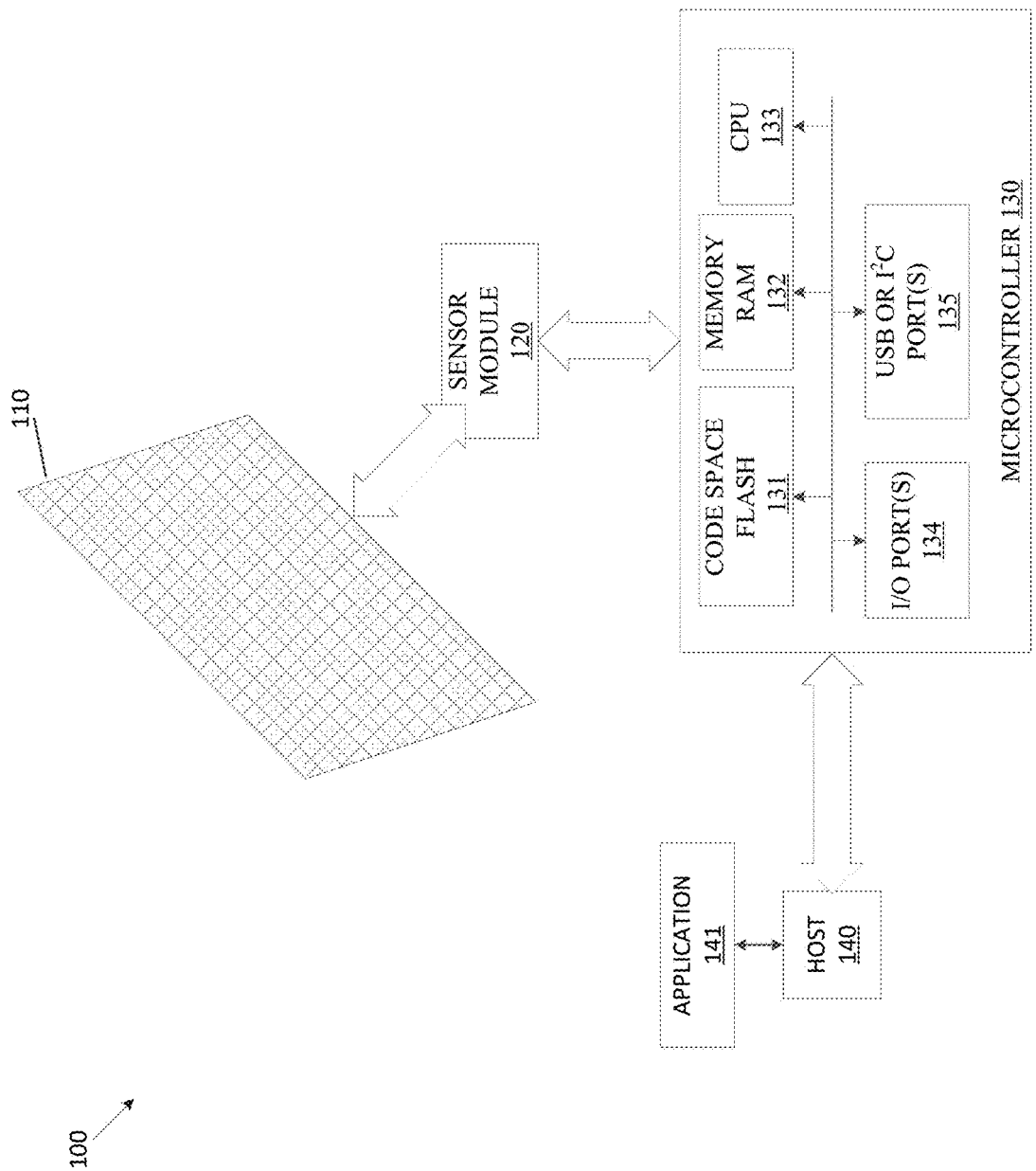
FIG. 5 shows a system that incorporates a sensor module implementing security features according to an embodiment of the disclosure.

In one embodiment, DIP-holes and SPIKE-peaks may be determined, node-by-node, responsive to exceeding a positive or negative threshold variation from a binomial asymptote trend of the reference values on a drive line. If a node's reference value is higher than a positive threshold it may be considered a SPIKE-peak and if it is less than the negative threshold it may be considered a DIP-hole. All nodes of a given drive line may be measured and the reference values used to determine a binomial asymptote trend line. The result of the determination may be converted into data bytes. For example, reference values may be read to an N×M matrix, where "N" corresponds to a number of drive lines associated with a sensor and "M" corresponds to a number of sense lines associated with a sensor. A binomial asymptote trend line may be determined from the reference values in the N×M matrix. An upper threshold P1 may be determined FIG. 5 illustrates a system 100 implementing a sensor module with security features according to various embodiments of the disclosure. The system 100 may include a touch panel 110 with at least one sensor module 120. The sensor module 120 may be coupled (e.g., electrically) to a microcontroller 130. The microcontroller 130 may be coupled to a host 140.

The microcontroller 130 may communicate with the host 140 by way of input/output ports 134. The microcontroller 130 may use communication protocols (ports 135) known to a person of ordinary skill in the art, for example, inter-integrated circuit (I²C) or Universal Serial Bus (USB), serial peripheral interface (SPI), universal asynchronous receiver/transmitter (UART), and universal synchronous/asynchronous receiver/transmitter (USART). Firmware may be stored in a code space of a flash memory 131 and executable by a CPU 133 for operation of the microcontroller 130. A RAM 132 provides addressable memory space for the microcontroller 130.

The host 140 may be configured to communicate with the microcontroller 130, including sending and receiving data. The host 140 may also be configured to communicate directly with a sensor module 120. The host 140 may include a CPU (not shown) that is configured to perform encryption and decryption functions in conjunction with the various embodiments described herein. In one embodiment, the CPU of the host 140 may be an INTEL® ATOM™ or MIPS (microprocessor without interlocked pipeline stages) processor. The host 140 may also include memory, including secure memory and/or secure memory locations. The host 140 may also include network equipment (not shown) for communicating with remote systems, including over the internet.

Figure 6:
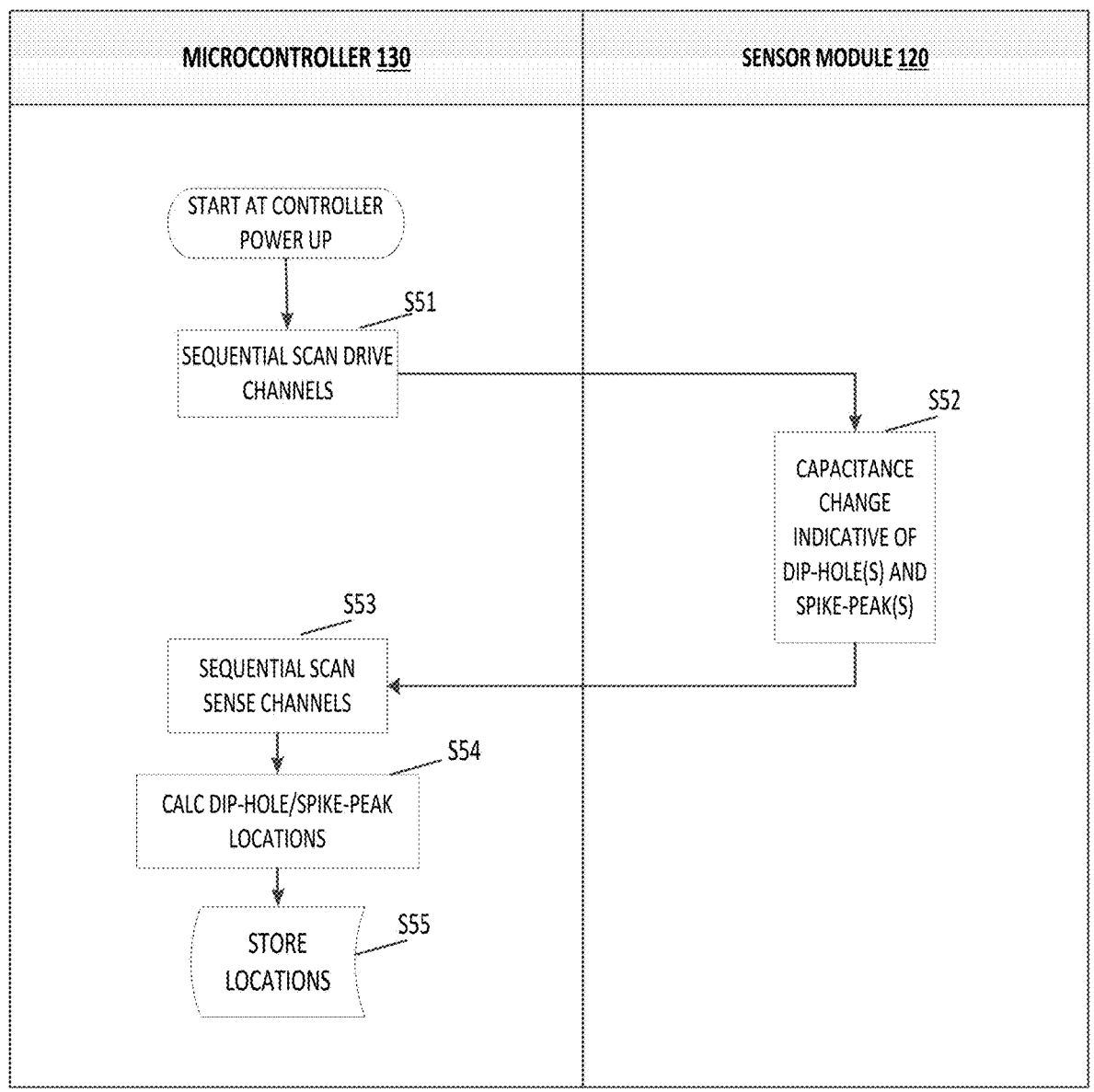
FIG. 6 shows a flowchart of a process for determining the location(s) of security feature(s) in a sensor module.

FIG. 6 illustrates a process 50 for determining the DIP-hole and SPIKE-peak locations, in accordance with embodiments of the disclosure. The process 50 may be part of, or operate in conjunction with, a process for verifying a touch panel input device. The process 50 may be implemented in firmware stored at the flash memory 131 and executed by the CPU 133. The microcontroller 130 may initiate a sequential scan of drive channels of sensor module 120 in operation S51. A capacitive change with reference values indicative of DIP-holes and SPIKE-peaks occurs at the sensor module 120 in operation S52. The node reference values are captured by the microcontroller 130 during sequential scanning of the sense channels of the sensor module 120 in operation S53. The microcontroller 130 calculates the location of the DIP-hole nodes and SPIKE-peak nodes in operation S54, and stores the locations in operation S55.

In one embodiment, the microcontroller 130 may determine the location of the DIP-hole nodes and SPIKE-peak nodes at power-up, however, one of ordinary skill in the art would understand that the locations may be determined at different times or phases of operation (e.g., at runtime). For example, the microcontroller 130 may determine the locations of the DIP-hole nodes and SPIKE-peak nodes every time a host requests verification, at one or more defined intervals, at other times, or responsive to other events.

In one embodiment, a quadratic polynomial equation may be used to determine a location of DIP-holes and SPIKE-peaks at microcontroller power up. The result of the determination may be converted into data bytes.

Figure 7:
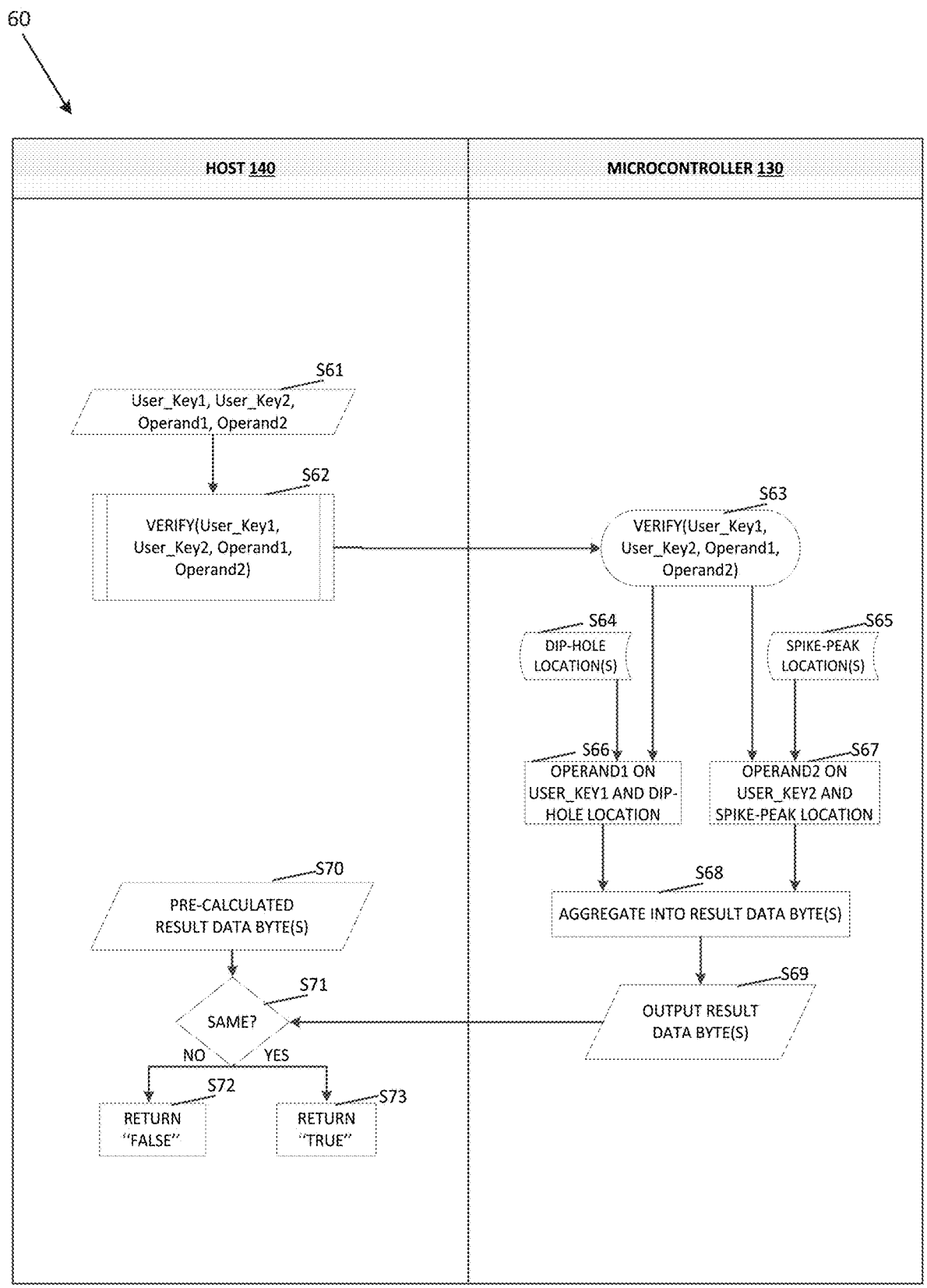
FIG. 7 shows a flowchart of a process for verifying a touch panel device implementing security features according to an embodiment of the disclosure.

FIG. 7 illustrates a process 60 for verifying a touch panel device according to an embodiment of the disclosure. The host 140 retrieves from memory a user_key1, a user_key2, an operand1, and an operand2, in operation S61. In one embodiment, user_key1 and user_key2 may each be 4 to 8 byte data words. The operand1 and operand2 may identify logical operations, for example, logical shifts left or right, AND, NAND, OR, NOR, XOR, etc. The host 140 calls a verification routine at the microcontroller 130 in operation S62. The host 140 may provide the user_key1, user_key2, operand1 and operand2 as parameters when it calls the verification routine.

The verification routine starts at the microcontroller 130 in operation S63. The verification routine may be implemented in the firmware stored at the flash memory 131 and executed by the CPU 133. The microcontroller 130 retrieves the locations of the DIP-hole nodes and SPIKE-peak nodes in operations S64 and S65. The logical operations identified by operand1 are performed on the user_key1 and DIP-hole location in operation S66, and the logical operations identified by operand2 are performed on user_key2 and SPIKE-peak in operation S67. The results of the operations are aggregated into result(s) in operation S68, and provided to the host 140 in operation S69.

The host 140 retrieves a pre-calculated data result byte(s) from secure memory (not shown) in operation S70, and compares the pre-calculated result to the result provided by the microcontroller 130 in operation S71. If the pre-calculated result is the same as the result provided by the microcontroller 130 then the touch panel is verified and a "true" is returned in operation S73. If the pre-calculated result byte is different than the result byte provided by the microcontroller 130 then the touch panel is not verified and a "false" is returned in operation S72.

Figure 8:
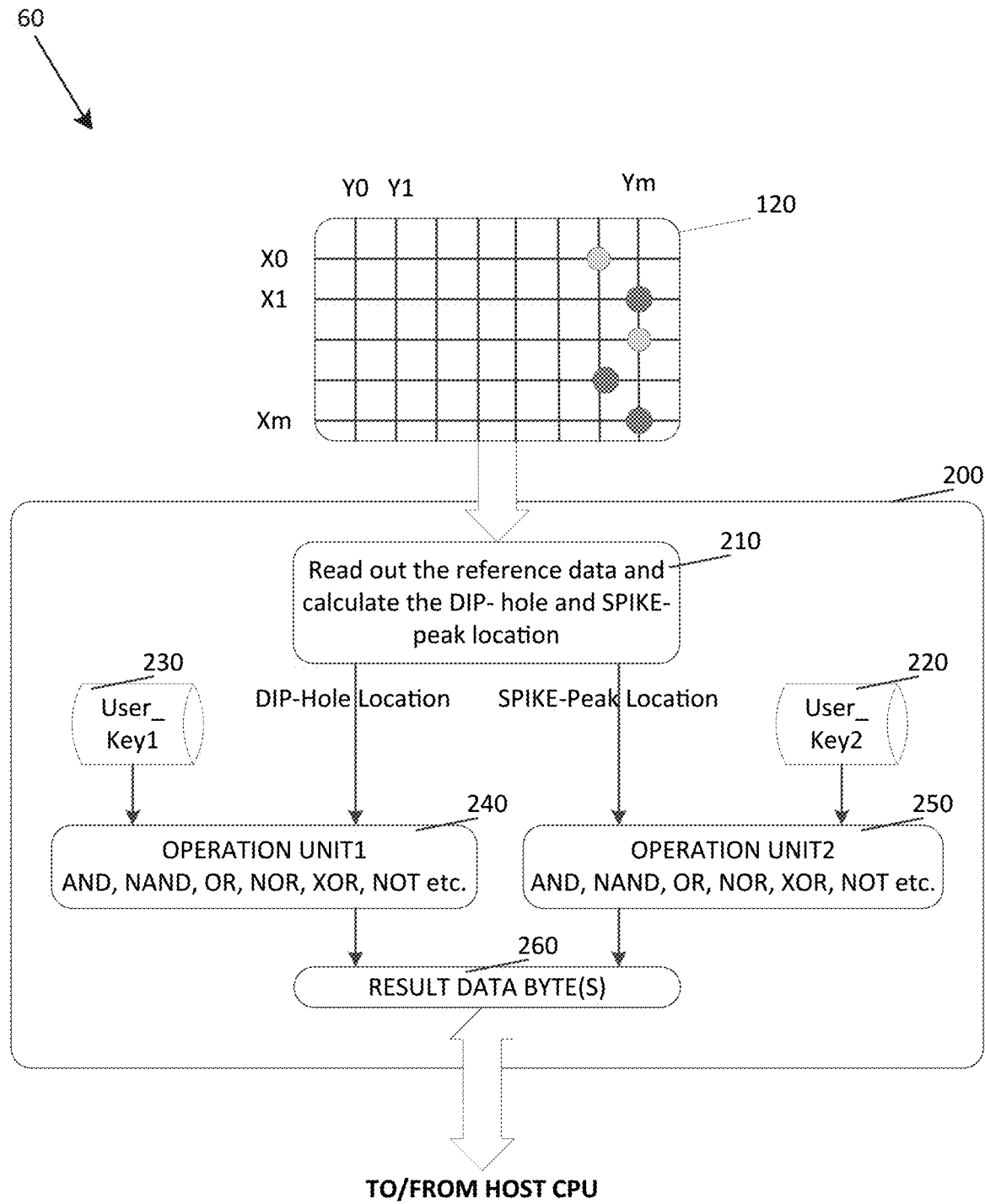
FIG. 8 shows a diagram of functional modules implementing the process of FIG. 6 according to an embodiment of the disclosure.

FIG. 8 illustrates the process 60 in terms of the functional modules of a software routine 200 implemented in firmware stored at flash memory 131 and executed by the CPU 133 of the microcontroller 130, in accordance with embodiments of the disclosure. The software routine 200 includes a module 210 configured to read out reference data and calculate DIP-hole locations and SPIKE-peak locations. An operation unit1 240 and an operation unit2 250 are configured to receive the locations of the DIP-hole and SPIKE-peak, as well as retrieve the stored user_key1 230 and stored user_key2 220. In one embodiment, the locations may be represented as two-byte data.

The operation unit1 240 and operation unit2 250 are configured to perform logical operations identified by operand1 and operand2 on location data for the DIP-hole, SPIKE-peak, user_key1 and user_key2. In one embodiment, the operation unit1 240 is configured to receive an 8-bit code with each bit representing an operation to be performed, for example: [NOP, R-SH1, XOR, R-SH2, L-SH1, XOR, OR, L-SH2]. By way of non-limiting example, if the operand1 is [10001 0010] then the operation unit1 240 may perform an OR, R-SH2 and NOP (no operation). In this example, the result byte of data (RBD) may be defined by the following equation:

$$RBD=(DV \text{ OR } UK1) \oplus (DV >> 2)$$

Where DV is the DIP-hole location and UK1 is the user_key1. It should be noted that the results of the OR and R-SH2 operation are XOR to each other in the above equation. The manner in which the operation unit1 240 executes the operations identified by the operand1 may be a design choice implemented in the configuration of the operation unit1 240 (and similarly for the operation unit2 250).

The module 260 may be configured to aggregate the results of the operation unit1 240 and operation unit2 250, and output the result to the host 140.

Figure 9:
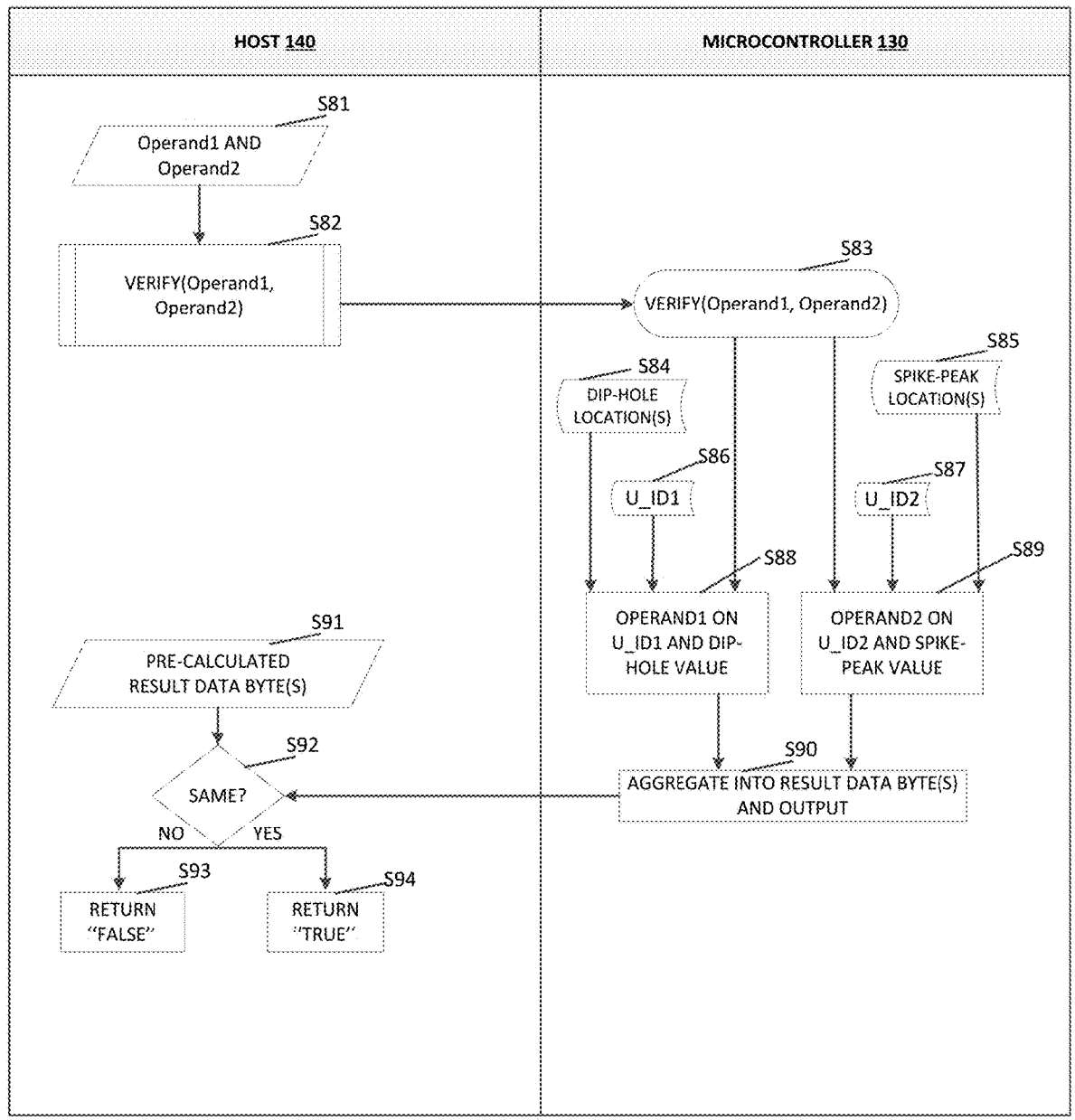
FIG. 9 shows a flowchart of a process for verifying a touch panel device implementing security features according to an embodiment of the disclosure.

FIG. 9 illustrates a process 80 for verifying a touch panel device, in accordance with embodiments of the disclosure. In one embodiment, and as shown in FIG. 8, the host 140 does not keep user keys. The microcontroller 130 uses unique IDs stored at the microcontroller 130 at setup.

The host 140 may retrieve from memory an operand1 and an operand2, in operation S81. The operand1 and operand2 may identify logical operations, for example, logical shifts left or right, AND, NAND, OR, NOR, XOR, etc. The host 140 may call a verification routine (VERIFY) at the microcontroller 130 in operation S82. The host 140 may provide the operand1 and operand2 as parameters when it calls the routine.

A verification routine (VERIFY) starts at the microcontroller 130 in operation S83. The verification routine may be implemented in the firmware stored at the flash memory 131 and executed by the CPU 133. The microcontroller 130 retrieves the stored locations of the DIP-hole nodes and SPIKE-peak nodes in operation S84 and S85. The unique IDs U_ID1 and U_ID2 may be read in operations S86 and S87. The logical operations identified by operand1 may be performed on the U_ID1 and DIP-hole locations in operation S88, and the logical operations identified by operand2 may be performed on U_ID2 and SPIKE-peak locations in operation S89. The results of the operations may be aggregated into result byte(s) and provided to the host 140 in operation S90.

The host 140 retrieves a pre-calculated result from secure memory in operation S91 and compares the pre-calculated result to the result provided by the microcontroller 130 in operation S92. If the pre-calculated result is the same as the result byte provided by the microcontroller 130 then the touch panel is verified and a "true" is returned in operation S94. If the pre-calculated result is different than the result provided by the microcontroller 130 then the touch panel is not verified and a "false" is returned in operation S93.

Figure 10:
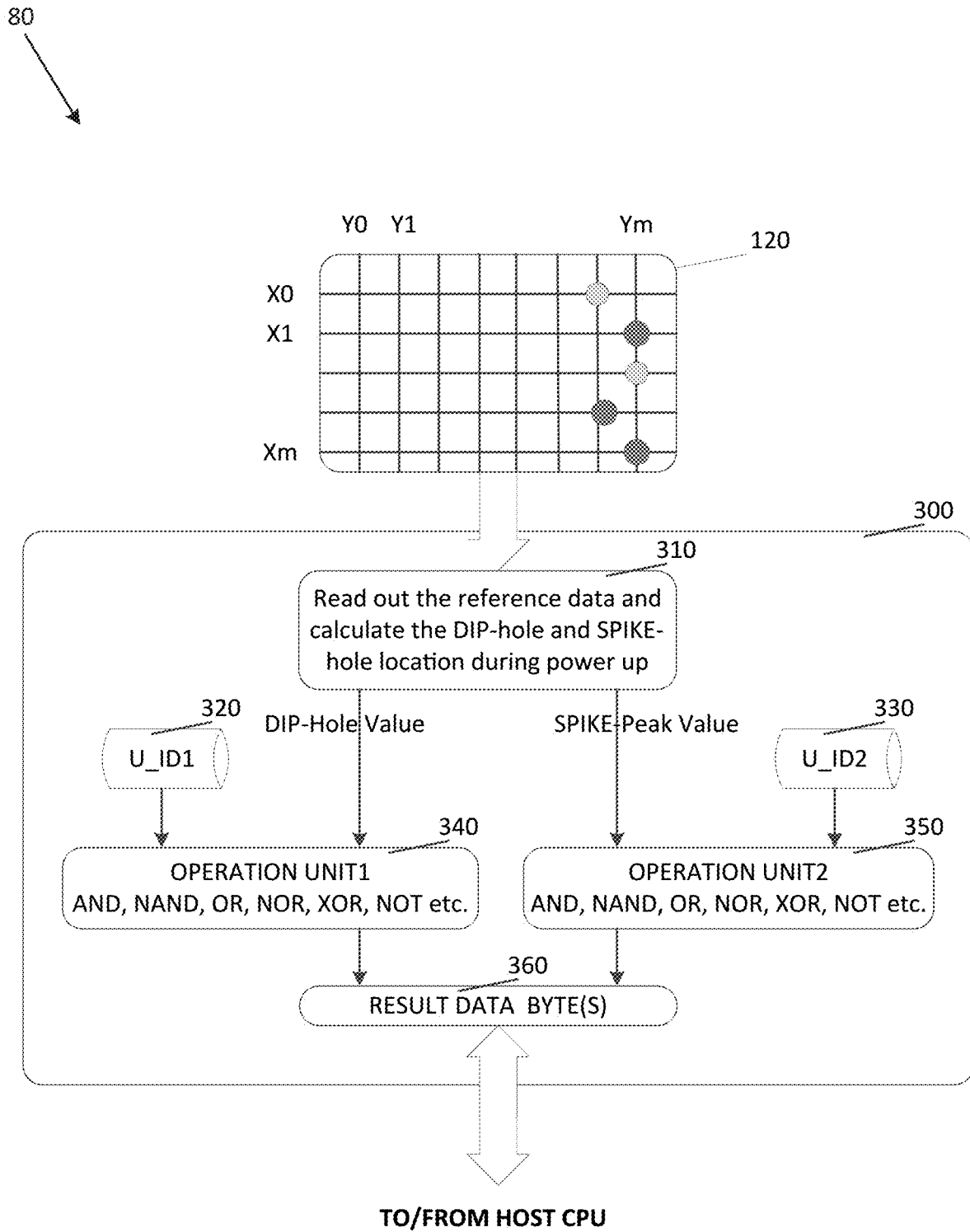
FIG. 10 shows a diagram of the functional modules implementing the process of FIG. 8 according to an embodiment of the disclosure.

FIG. 10 illustrates the process 80 in terms of the functional modules of a software routine 300 in the firmware of the microcontroller 130 according to an embodiment of the disclosure. The software routine 300 includes a module 310 configured to read out the reference data and calculate the DIP-hole locations and SPIKE-peak locations. An operation unit1 340 and operation unit2 350 receive the location values for the DIP-hole and SPIKE-peak, as well as receive the stored unique IDs U_ID1 320 and U_ID2 330.

The operation unit1 340 and operation unit2 350 are configured to perform the logical operations identified by the operand1 and operand2 on the location data of the DIP-hole nodes, SPIKE-peak nodes, U_ID1 and U_ID2. The module 360 is configured to aggregate the results of the operation unit1 340 and operation unit2 350, and output the result to the host 140.

Figure 11:
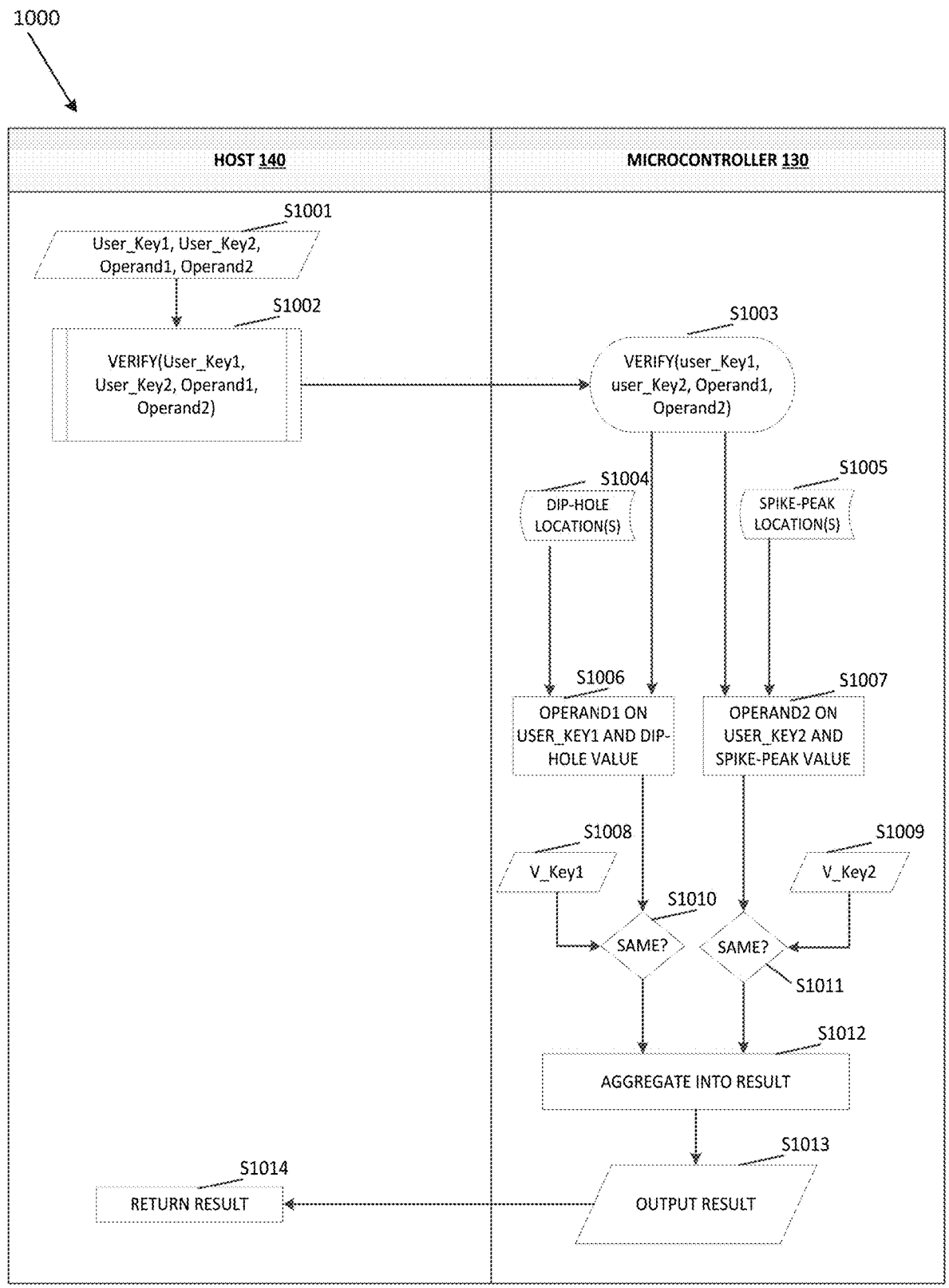
FIG. 11 shows a flowchart of a process for verifying a touch panel device implementing security features according to an embodiment of the disclosure.

FIG. 11 illustrates a process 1000 for verifying a touch panel device according to another embodiment of the disclosure. In the embodiment illustrated in FIG. 11, the microcontroller 130 performs the verification and provides a verification result to the host 140.

The host 140 retrieves from memory a user_key1, a user_key2, an operand1, and an operand2, in operation S1001. The operand1 and operand2 identify logical operations, for example, logical shifts left or right, AND, NAND, OR, NOR, XOR, etc. The host 140 calls a verification routine at the microcontroller 130 in operation S1002. The host 140 provides the user_key1, user_key2, operand1 and operand2 as parameters when it calls the routine.

The verification routine starts at the microcontroller 130 in operation S1003. The verification routine may be implemented in the firmware stored at the flash memory 131 and executed by the CPU 133. The microcontroller 130 retrieves the stored locations of the DIP-hole nodes and SPIKE-peak nodes in operations S1004 and S1005. The logical operations identified by the operand1 are performed on the user_key1 and the DIP-hole location in operation S1006, and the logical operations identified by operand2 are performed on user_key2 and SPIKE-peak location in operation S1007. Stored verify keys, v_key1 and v_key2, are read in operations S1008 and S1009. The results of the operations S1006 and S1007 are compared to verification keys v_key1 and v_key2 in operations S1010 and S1011. The results of the comparisons are aggregated into a result in operation S1012 and provided to the host 140 in operation S1013. The host 140 returns the result of the process 1000 in operation S1014, for example, "true" if the touch panel is verified, "false" if the touch panel is not verified.

Figure 12:
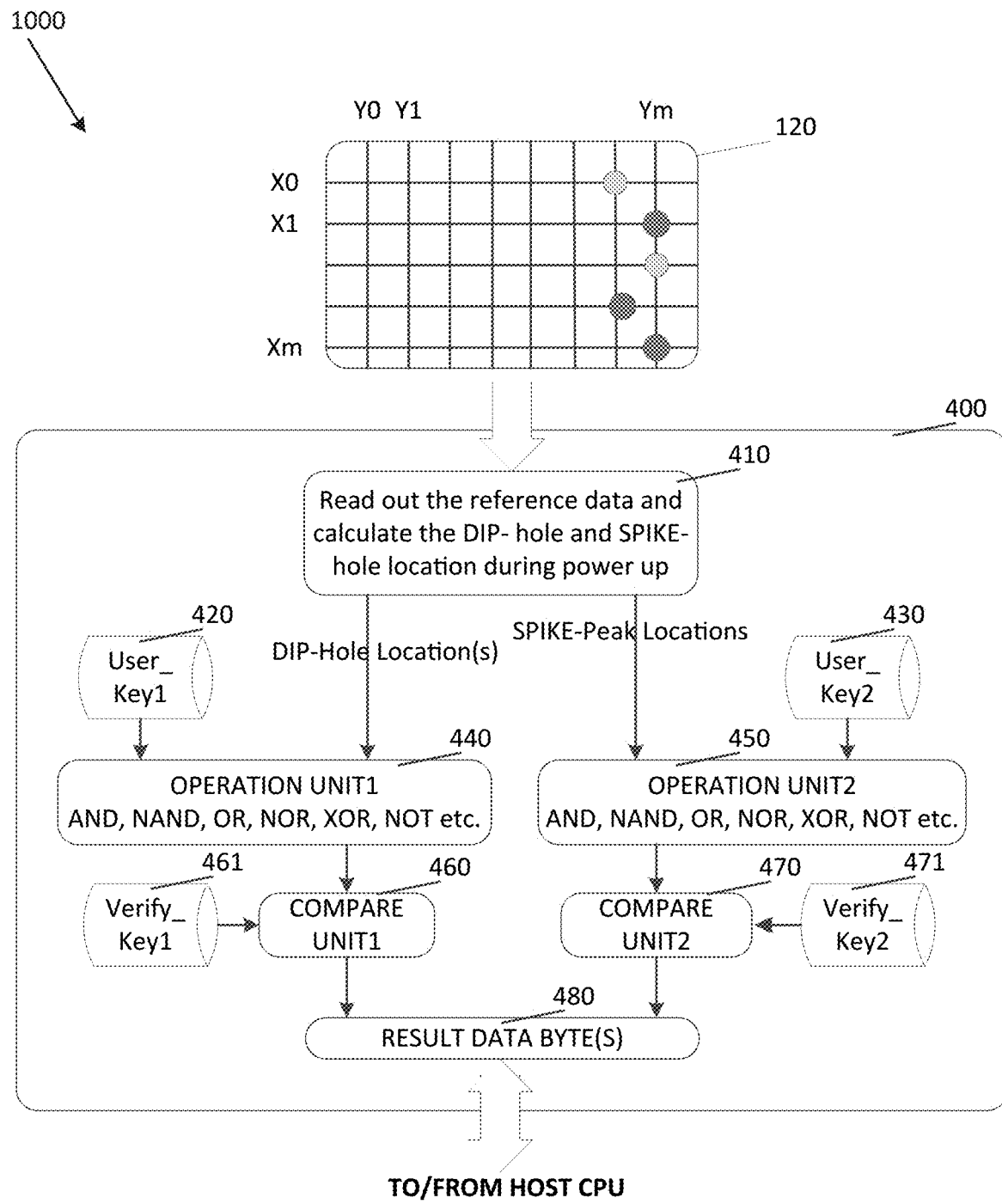
FIG. 12 shows a diagram of the functional modules implementing the process of FIG. 10 according to an embodiment of the disclosure.

FIG. 12 illustrates the process 1000 in terms of the functional modules of software routine 400 in the firmware of the microcontroller 130, according to an embodiment of the disclosure. The software routine 400 includes a module 410 configured to read out the reference data and calculate the DIP-hole locations and SPIKE-peak locations. An operation unit1 440 and operation unit2 450 receive the location data for the DIP-hole and SPIKE-peak, as well as receive the stored unique user_key1 420 and user_key2 430.

The operation unit1 440 and operation unit2 450 are configured to perform the logical operations identified by operand1 and operand2 on the location data for the DIP-hole nodes and SPIKE-peak nodes, the U_ID1 and the U_ID2. A compare unit1 460 is configured to receive and compare the result of the operation unit1 440 and a verify key1 461. A compare unit2 470 is configured to receive and compare the result of the operation unit1 440 and a verify key2 471. The module 480 is configured to aggregate the results from the compare unit1 460 and compare unit2 470 and provide the results to the host 140.

In the case of a "false" result to a verification process at the host 140, the host 140 may reject reported "touches" and associated input entered at a touch panel device. For example, a user input PIN-code, a start command, etc., may be rejected or ignored.

In one embodiment, multiple user keys may be stored and used by the host 140. For example, a host may randomly select a user key from among a plurality of user keys to perform the processes described herein with reference to FIGS. 6 and 12. During set-up of a microcontroller 130 and a sensor module 120, pre-calculated results may be generated for each available user key and stored in a secure memory of the host 140.

In one embodiment, the host 140 may request the user_key1, user_key2, operand1, operand2, and pre-calculated result byte from a remote server, and store the data bytes in memory. The host 140 may send requests periodically, according to a schedule or randomly, or responsive to triggering events. The host 140 may store in memory the user_key1, user_key2, operand1, operand2, and pre-calculated result byte received from the remote server for later retrieval with process 60. In one embodiment, the host 140 may receive the user_key1, user_key2, operand1, operand2, and pre-calculated result byte from a remote server without a request, for example, the remote server may initiate an update process to provide the updated data bytes.

In one embodiment, the host 140 may be configurable to use store user_key1, user_key2, operand1, operand2, and pre-calculated result byte in memory or to request the user_key1, user_key2, operand1, operand2, and pre-calculated result byte from a remote server.

In one embodiment, verification keys may be determined and stored at secure memory of the microcontroller 130 at integration of the sensor modules 120 having security features and the microcontroller 130. A host 140 may be configured to interrogate a verification key stored by the microcontroller 130 to verify an associated touch panel. In one embodiment, the host 140 may compare a verification key received from a microcontroller 130 to a pre-calculated result byte stored in secure memory at the host 140.

In one embodiment, executing processes may perform the logical operations described herein that are associated with the functional blocks shown in FIGS. 8, 10 and 12. In one embodiment, the functional blocks shown in FIGS. 8, 10 and 12 may correspond to memory registers configured to store data bytes described herein, and the memory registers may be usable by executing processes performing the operations described herein.

One of ordinary skill in the art will recognize the present disclosure has many advantages and benefits. One advantage of the disclosure is that if a sensor module is cloned, it will not have the security features, e.g., the DIP-holes and/or SPIKE-peaks.

It is specifically contemplated that alternative, modified, and additional security features may be implemented beyond those described herein. For example, if the sensor manufacturer does not have the capability or desire to perform a laser-trim to introduce a DIP-hole, then a unique ID or code value may be stored and used.

Many of the functional units described in this specification may be illustrated, described or labeled as modules, threads, or other segregations of programming code, in order to more particularly emphasize their implementation independence. Modules may be at least partially implemented in hardware, in one form or another. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented using software or firmware, stored on a physical storage device (e.g., a computer readable storage medium), in memory, or a combination thereof for execution by various types of processors.

An identified module of executable code may, for instance, comprise one or more physical or logical blocks of computer instructions, which may, for instance, be organized as a thread, object, procedure, or function. Nevertheless, the executable code of an identified module need not be physically located together, but may comprise disparate instructions stored in different locations that, when joined logically together, comprise the module and achieve the stated purpose for the module.

Indeed, a module of executable code may be a single instruction, or many instructions, and may even be distributed over several different code segments, among different programs, and across several storage or memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more physical devices, which are referred to herein as computer readable media.

In some embodiments, the software portions are stored in a non-transitory state such that the software portions, or representations thereof, persist in the same physical location for a period of time. Additionally, in some embodiments, the software portions are stored on one or more non-transitory storage devices, which include hardware elements capable of storing non-transitory states and/or signals representative of the software portions, even though other portions of the non-transitory storage devices may be capable of altering and/or transmitting the signals. Examples of non-transitory storage devices are Flash memory and random-access-memory (RAM). Another example of a non-transitory storage device includes a read-only memory (ROM) that can store signals and/or states representative of the software portions for a period of time. However, the ability to store the signals and/or states is not diminished by further functionality of transmitting signals that are the same as or representative of the stored signals and/or states. For example, a processor may access the ROM to obtain signals that are representative of the stored signals and/or states in order to execute the corresponding software instructions.

Although each operation illustrated by or in connection with FIGS. 1 through 12 and accompanying text recites acts performed in a particular order, embodiments of the present disclosure do not necessarily need to operate in that recited order. One of ordinary skill in the art would recognize many variations, including performing acts in parallel, or in a different order.

While certain illustrative embodiments have been described in connection with the figures, those of ordinary skill in the art will recognize and appreciate that the scope of this disclosure is not limited to those embodiments explicitly shown and described in this disclosure. Rather, many additions, deletions, and modifications to the embodiments described in this disclosure may be made to produce embodiments within the scope of this disclosure, such as those specifically claimed, including legal equivalents. In addition, features from one disclosed embodiment may be combined with features of another disclosed embodiment while still being within the scope of this disclosure, as contemplated by the inventors.

Additional non-limiting embodiments of the disclosure include:

Embodiment 1

A method of authenticating a touch panel, the method comprising: requesting an identifier from the touch panel; receiving the identifier from the touch panel indicative of one or more security features present in a sensor module of the touch panel; and authenticating the touch panel responsive to a comparison of the received identifier to a predetermined identifier.

Embodiment 2

The method of Embodiment 1, further comprising providing one or more keys when requesting the identifier from the touch panel.

Embodiment 3

A microcontroller system, the system comprising: a first module configured to read a capacitive charge cycle value indicative of a first security feature present in a capacitive sensor module; a second module configured to store a first node location associated with the first security feature; and a third module configured to modify the first node location responsive to a first key to generate a first result.

Embodiment 4

A method of generating an identifier associated with a capacitive sensor, the method comprising: retrieving a first node location associated with a first security feature present in a capacitive sensor; modifying the first node location responsive to a first key to generate a first result.

Embodiment 5

The method of Embodiment 4, further comprising, retrieving a second node location associated with a second security feature present in a capacitive sensor; and modifying the second node location responsive to a second key to generate a second result.

Embodiment 6

The method of Embodiment 5, further comprising aggregating the first node location and second node location to generate a final result.

Embodiment 7

The method of Embodiment 6, further comprising associating the final result to the capacitive sensor.

Embodiment 8

The method of Embodiment 4, wherein the method is performed as part of an integration of a touch panel comprising the touch sensor and a host device.

Embodiment 9

The method of Embodiment 4, wherein the method is performed as part of a verification of a touch panel requesting to provide input data to a host device.

We claim:

1. A method of generating an identifier associated with a capacitive sensor, the method comprising:
   driving a drive line of a capacitive sensor;
   reading reference values received at sense lines of the capacitive sensor responsive to the driven drive line, wherein a first reference value of the reference values is indicative of a first security feature present in the capacitive sensor;
   determining location data for a first node associated with the first security feature responsive to the first reference value; and
   performing a logical operation on the location data for the first node and a first key to generate a first result.

2. The method of claim 1, wherein the reference values are indicative of capacitive charge cycles.

3. The method of claim 1, further comprising retrieving the first key from secure memory.

4. The method claim 1, further comprising receiving the first key from an external host.

5. The method of claim 1, further comprising, providing the first result to a communication interface, wherein the communication interface enables communication with an external host.

6. The method of claim 1, further comprising:
   determining location data for a second node associated with a second security feature responsive to a second reference value, wherein a second reference value of the reference values is indicative of a second security feature present in the capacitive sensor;
   performing a logical operation on the location data for the second node and a second key to generate a second result; and
   combining the first result and the second result to generate a final result.

7. The method of claim 6, further comprising, providing the final result to a communication interface, wherein the communication interface enables communication with an external host.

8. The method of claim 6, further comprising retrieving the second key from secure memory.

9. The method of claim 6, further comprising receiving the second key from an external host.

10. The method of claim 6, further comprising resolving an identity of a capacitive sensor at least in part responsive to comparing the second result to a pre-calculated result.

11. The method of claim 1, wherein determining the location data for the first node comprises:
   determining an average node reference value;
   determining a difference between the first reference value and the average node reference value; and
   associating the first reference value with the first security feature responsive to the difference exceeding a threshold.

12. The method of claim 11, wherein determining the location data for the first node further comprises associating the first reference value with a SPIKE-peak if the first reference value is greater than the average node reference value, and associating the first reference value with a DIP-hole if the first reference value is less than the average node reference value.

13. The method of claim 1, wherein determining the location data for the first node comprises:
   reading reference values into an N×M matrix, wherein N corresponds to a number of drive line associated with the capacitive sensor and M corresponds to a number of sense lines associated with the capacitive sensor;
   determining a binomial asymptote trend line responsive to the read reference values of the N×M matrix;
   determining a first threshold and a second threshold responsive to the binomial asymptote trend line; and
   associating the first reference value with the first security feature responsive to a comparison of the first reference value to the first threshold or second threshold.

14. The method of claim 13, wherein determining the location data for the first node further comprises associating the first reference value with a SPIKE-peak if the first reference value is greater than the first threshold, and associating the first reference value with a DIP-hole if the first reference value is less than the second threshold.

15. The method of claim 1, further comprising decreasing a capacitive charge time associated with electrodes of the drive line.

16. A microcontroller, comprising:
   a processor; and
   a memory, wherein instructions stored on the memory and executable by the processor are configured to enable the microcontroller to:
   drive a drive line of a capacitive sensor;
   read reference values received at sense lines of the capacitive sensor responsive to the driven drive line, wherein a first reference value of the reference values is indicative of a first security feature present in the capacitive sensor;
   determine location data for a first node associated with the first security feature responsive to the first reference value; and
   perform a logical operation on the location data for the first node and a first key to generate a first result.

17. The microcontroller of claim 16, wherein the reference values are indicative of capacitive charge cycles.

18. The microcontroller of claim 16, wherein the instructions stored on the memory and executable by the processor are configured to enable the microcontroller to retrieve the first key from secure memory.

19. The microcontroller of claim 16, wherein the instructions stored on the memory and executable by the processor are configured to enable the microcontroller to receive the first key from an external host.

20. The microcontroller of claim 16, wherein the instructions stored on the memory and executable by the processor are configured to enable the microcontroller to provide the first result to a communication interface, wherein the communication interface enables communication with an external host.

21. The microcontroller of claim 19, wherein the instructions stored on the memory and executable by the processor are configured to enable the microcontroller to:

determine location data for a second node associated with a second security feature responsive to a second reference value, wherein a second reference value of the reference values is indicative of a second security feature present in the capacitive sensor;

perform a logical operation on the location data for the second node and a second key to generate a second result; and combine the first result and the second result to generate a final result.

22. The microcontroller of claim 21, further comprising, providing the final result to a communication interface, wherein the communication interface enables communication with the external host.

23. The microcontroller of claim 21, further comprising retrieving the second key from secure memory.

24. The microcontroller of claim 21, further comprising receiving the second key from an external host.

25. The microcontroller of claim 16, wherein the processor and the memory comprise an integrated circuit package.

26. A method of verifying a touch panel, the method comprising:

retrieving user keys and operand instructions from secure memory of a host device;

providing the user keys and operand instructions with a verification request to a touch panel requesting to provide input data to the host device;

receiving a result data from the touch panel responsive to the verification request, the result data at least partially based on one or more security features present at the touch panel;

comparing the result data to a pre-calculated result byte stored in the secure memory of the host device; and verifying the result data responsive to the comparison.

27. The method of claim 26, further comprising, if the result byte is not verified then rejecting the input data from the host device.

28. The method of claim 26, further comprising, if the result byte is verified then rejecting the input data from the host device.

29. A system, comprising:

a host device; and a touch panel coupled to the host device and configured to provide input data to the host device, wherein the host device is configured to receive the input data responsive to verifying a verification result received from the touch panel, the touch panel configured to generate the verification result by:

driving a drive line of a capacitive sensor;

reading reference values received at sense lines of the capacitive sensor responsive to the driven drive line, wherein a first reference value of the reference values is indicative of a first security feature present in the capacitive sensor;

determining location data for a first node associated with the first security feature responsive to the first reference value; and performing a logical operation on the location data for the first node and a first key to generate a first result.

30. The system of claim 29, wherein the touch panel is configured to provide the verification result to the host device responsive to receiving a verification request from the host device.

31. The system of claim 30, wherein the verification request comprises user keys and operand instructions.

32. The system of claim 31, wherein the host device is configured to retrieve the user keys and operand instructions from secure memory of the host and include the user keys and operand instructions in the verification request.

* * * * *

UNITED STATES PATENT AND TRADEMARK OFFICE
CERTIFICATE OF CORRECTION

PATENT NO. : 10,713,348 B2  
APPLICATION NO. : 15/904147  
DATED : July 14, 2020  
INVENTOR(S) : Hsin-Ching Chih and Chi-Chun Cheng Page 1 of 1

It is certified that error appears in the above-identified patent and that said Letters Patent is hereby corrected as shown below:

On the Title Page

In Item (73), Line 2     change "Changler, AZ (US)" to --Chandler, AZ (US)--

Signed and Sealed this  
Tenth Day of November, 2020

Andrei Iancu  
*Director of the United States Patent and Trademark Office*